United States Patent
Seidl

(10) Patent No.: US 9,476,460 B2
(45) Date of Patent: Oct. 25, 2016

(54) DRIVE ASSEMBLY WITH A CLUTCH

(71) Applicant: GKN Driveline International GmbH, Lohmar (DE)

(72) Inventor: Holger Seidl, Siegburg (DE)

(73) Assignee: GKN Driveline International GmbH, Lohmar (DE)

( * ) Notice: Subject to any disclaimer, the term of this patent is extended or adjusted under 35 U.S.C. 154(b) by 55 days.

(21) Appl. No.: 14/524,129

(22) Filed: Oct. 27, 2014

(65) Prior Publication Data

US 2015/0114786 A1    Apr. 30, 2015

(30) Foreign Application Priority Data

Oct. 29, 2013  (DE) .................. 10 2013 111 891

(51) Int. Cl.
| | |
|---|---|
| *F16H 48/24* | (2006.01) |
| *F16D 11/14* | (2006.01) |
| *F16D 13/46* | (2006.01) |
| *F16D 27/09* | (2006.01) |

(52) U.S. Cl.
CPC ............. *F16D 13/46* (2013.01); *F16D 27/09* (2013.01); *F16H 48/24* (2013.01); *Y10T 29/49895* (2015.01)

(58) Field of Classification Search
CPC ....... F16D 27/09; F16D 13/46; F16D 27/118
See application file for complete search history.

(56) References Cited

U.S. PATENT DOCUMENTS

| | | | | |
|---|---|---|---|---|
| 8,858,384 | B2 * | 10/2014 | Fusegi ................ | F16H 48/24 192/108 |
| 2012/0252621 | A1 * | 10/2012 | Seidl .................. | B60K 6/52 475/150 |

FOREIGN PATENT DOCUMENTS

| | | |
|---|---|---|
| DE | 689 05 684 T2 | 7/1993 |
| DE | 10 2009 056 088 A1 | 9/2011 |
| EP | 1 142 743 A2 | 10/2001 |

* cited by examiner

*Primary Examiner* — Ramya Burgess
*Assistant Examiner* — Lillian Nguyen
(74) *Attorney, Agent, or Firm* — Bejin Bieneman PLC

(57) ABSTRACT

A drive assembly comprises a rotatingly drivable housing an output part and a clutch arranged between the rotatably drivable housing and the output part. The clutch comprises a first clutch part held relative to the housing in a rotationally fixed and axially movable way, as well as a second clutch part fixedly connected to the output part arranged in the rotatably drivable housing; a controllable actuator for actuating the clutch; a target element which, upon actuation of the clutch, is axially movable; and a sensor for recording switched positions of the clutch; wherein the first clutch part comprises an annular portion arranged outside the housing, and a plurality of cam elements that extend axially from the annular portion through the apertures in the housing into the interior of the housing.

16 Claims, 5 Drawing Sheets

DRIVE ASSEMBLY WITH A CLUTCH

CROSS-REFERENCE TO RELATED APPLICATIONS

This application claims the benefit of priority from German Patent Application No. 10 2013 111 891.7, filed on Oct. 29, 2013, the entire contents of which prior application are hereby incorporated herein by reference.

BACKGROUND

From DE 10 2009 056 088 A1 there is known a differential assembly with a coupling assembly. The differential assembly comprises a driving gear, a differential drive, and a coupling which is effectively arranged between the driving gear and the differential drive. Furthermore, an actuator is provided for actuating the coupling, a sensor for determining several coupling positions and a target element which cooperates with the sensor. The target element is provided in the form of an annular disc which, on its radial inside, comprises a plurality of circumferentially distributed and axially extending resilient engaging elements. The resilient engaging elements form-fittingly engage undercuts at axial projections of the axially movable coupling part of the coupling.

SUMMARY

Disclosed herein is a drive assembly, e.g., for being used in the driveline of a motor vehicle, comprising a clutch which is arranged in the power path between a rotatably drivable housing and a driving axle of the motor vehicle, and a controllable actuator for operating the clutch such that a first clutch part and a second clutch part are selectively connectable to one another for transmitting torque and, respectively, can be separated from one another by being opened. Such drive assemblies serve to control the transmission of torque between a drive source and the driving axle of the motor vehicle. Furthermore, a drive assembly can comprise a transmission unit, for instance a differential drive which splits up an introduced torque to the two sideshafts of the driving axle. Furthermore, a method of mounting such a drive assembly is disclosed.

Accordingly, a drive assembly is disclosed, e.g., for being used in the driveline of a motor vehicle, that is easy to mount, that ensures a secure connection of the target element and allows for reliable identification of different clutch positions. A disclosed method of mounting such a drive assembly is easy to carry out and allows the target element to be securely fixed, and different switching positions of the clutch to be reliably identified.

The drive assembly comprises a rotatably drivable housing, an output part, and a clutch which is arranged in the power path between the rotatably drivable housing and the output part, wherein the clutch comprises a first clutch part which is held so as to be rotationally fixed and axially movable relative to the housing, as well as a second clutch part which is fixedly connected to the output part and is arranged in the rotatably drivable housing; a controllable actuator for actuating the clutch such that the first clutch part and the second clutch part can be selectively connected to one another for transmitting torque; a target element which is axially movable upon actuation of the clutch; a sensor which cooperates with the target element for determining at least one clutch position of the clutch; wherein the first clutch part comprises an annular portion which is arranged outside the housing, as well as a plurality of cam elements which extend axially from the annular portion through apertures in the housing into the interior of the housing. The cam elements of the first clutch part can be selectively made to engage the second clutch part for transmitting torque.

Because the annular portion of the movable clutch part is arranged outside the housing, the connection between the clutch part and the target element can be configured particularly robustly in an advantageous way. The target element can be axially supported on the first clutch part at least over the largest part of its circumferential extension, e.g., over the entire circumference. In this way, a planar contact face around the circumference is obtained, with undesirable deformations of the target element being avoided. Overall, this design achieves a high degree of stiffness and strength of the unit comprising the clutch part and the target element, which, in turn, has an advantageous effect on the sensing accuracy between the target element and the sensor. A further advantage of the annular portion of the first clutch part being arranged outside the housing is that a particularly good radial support and axial guidance is achieved. A sliding disc which selectively can be connected to the first clutch part can thus be supported around the entire circumference in an advantageous way, which leads to a high degree of stiffness and strength.

The clutch is, e.g., provided in the form of a form-locking clutch, e.g., in the form of a dog clutch, toothed clutch or claw clutch. It is understood that other types of clutches are conceivable which engage and disengage the power transmission, for example a force-locking clutch such as a friction plate clutch or multi-plate coupling. According to a preferred embodiment, the cam element each comprise a toothed portion at an end facing the second clutch part, which toothed portion can selectively be made to engage or disengage counter teeth of the second clutch part.

The first clutch part is connected to the rotatably drivable housing in an axially movable and rotationally fixed way. The annular portion of the first clutch part is arranged outside the housing, whereas the cam element engage the apertures of the housing and extend through these into the interior of the housing. Thus, a torque introduced into the first clutch part is transmitted by the cam elements to the rotatingly drivable housing.

The first clutch part is axially guided and coaxially centred relative to the housing. According to a first possibility, this can be effected by the cam elements which each comprise an outer face, wherein each outer face can be radially supported against an associated inner face of the aperture so that the first clutch part is coaxially arranged relative to the housing. Between the outer faces of the cam elements and the inner faces of the apertures a clearance fit can be provided to ensure axial movability between the first clutch part and the differential housing. This embodiment, wherein centring is achieved via the cam elements, is advantageous by ensuring a reliable guidance of the cam elements, and thus a secure engagement of the two clutch parts when the clutch is actuated. Undesirable tilting of the first clutch part is avoided. According to a second possibility, the first clutch part can also be coaxially guided relative to the housing by an inner face of the annular portion which is centred with a radial clearance on an outer face of the differential housing.

The cam elements project axially from the annular portion and can thus also be referred to as axial projections. The annular portion and the cam elements can be integrally formed, i.e., produced in one piece. However, it is to be understood that the cam elements and the annular portion can initially be produced separately and subsequently connected to each other, for example with bolted or welded connections.

The cam elements are, e.g., axially guided in the housing apertures, so that, when the clutch is actuated, the first clutch part is prevented from tilting and, in consequence, from being axially displaced. In order to prevent any undesirable noise, the rotational play between the cam elements and the associated apertures (clearance fit in the circumferential direction) is kept to a minimum. The number of cam elements e.g., corresponds to the number of housing apertures and can, more particularly, amount to three, four or five; in principle, a larger number is also conceivable. The cam elements and respective apertures can be uniformly distributed around the circumference.

The actuator can be arranged outside the differential housing, e.g., so as to axially adjoin the annular portion of the first clutch part. The rotatably drivable housing of the transmission unit, e.g., comprises a sleeve projection on which there is arranged the annular portion of the first clutch part and the actuator, respectively. The annular portion, e.g., comprises a sliding element which cooperates with the actuator and which, more particularly, is rotatable and axially supported relative to a rotationally fixed component of the actuator. The sliding element can be disc-shaped and can be located in an annular recess in the end face of the annular portion, which end face faces the actuator. The actuator can be axially supported indirectly via an intermediate element, for example via a rolling contact bearing for rotatably supporting the drivable housing in a fixed housing, or directly relative to a fixed housing. The sleeve projection can be at least indirectly axially supported relative to the actuator.

The second clutch part is arranged inside the rotatably drivable housing and fixedly connected to the output part. The output part can be provided in the form of a carrier element of a transmission unit via which torque can be introduced into the transmission unit. To achieve simple production and mounting procedures, it is advantageous if the output part and the second clutch part are integrally formed, i.e., produced in one piece. The second clutch part can be arranged at an end face of the output part and can be designed in the form of teeth, claws or other form-locking means which can be made to form-fittingly engage the respective form-locking means of the cam elements.

The target element refers to an object being sensed by the sensor, i.e., the sensor's target. The target element is connected to the first clutch part in such a way that, when the clutch is actuated, it is axially moved together with the first clutch part. More particularly, it is proposed that the target element is axially supported against the first clutch part in at least one direction. The target element can be releasably or non-releasably connected to the first clutch part. According to an embodiment, the target element, on its radial inside, can comprise an annular supporting portion by means of which it is axially supported against a stop of the first clutch part. The stop can be provided in the form of a flange portion of the clutch part, with other embodiments of the stop such as a securing ring, which engages a groove in the clutch part also being conceivable. The target element is, e.g., axially supported towards the actuator and can be axially loaded by a pre-tensioned spring against the stop.

In addition to the axial support, the target element can also be connected to the clutch part in a rotationally fixed way. Other methods of connecting the target part to the clutch part are also conceivable, for example a form-locking, force-locking or material locking connection. In these embodiments wherein the target element is connected to the clutch part in a releasable or non-releasable and/or in a rotationally fixed way, the target element is e.g., provided in the form of a flat formed plate metal part. According to a further embodiment, the target part can also be configured so as to form one piece with the annular portion.

In all the above-mentioned embodiments, the target element can comprise an annular disc or can be produced in the form of an annular disc. An annular disc is advantageous in that it can be supported and fixed around is entire circumference against the clutch part, which has an advantageous effect on stiffness and dimensional accuracy. The material of the target element depends on the sensor used which senses the movement of the target element. If a magnetic field sensor is used, the target element is made out of a ferromagnetic material. If an induction sensor is used, the target element is made out of a para-magnetic material. The sensor is configured to sense at least one, e.g., two or more positions of the target element and thus of the clutch. In an embodiment, the sensor can be configured to determine at least a fully open position, a fully closed position and at least one intermediate clutch position.

According to an embodiment, a return spring is provided which is arranged at least indirectly between the first clutch part and the rotatingly drivable housing, wherein the return spring loads the first clutch part in the opening sense of the clutch, i.e., away from the second clutch part. At least indirectly means that the return spring can be supported directly against the housing and the first clutch part, respectively, or indirectly via a further component, for instance the target element. The return spring is e.g., arranged with pre-tension between the housing and the annular disc and can be provided more particularly in the form of a conical or helical spring, with other types of springs such as one or several plate springs also being suitable.

The actuator can be provided in the form of an electro-magnetic actuator having an electro-magnet and a piston. The piston is configured such that when the electro-magnet is electrified, the piston is axially loaded towards the clutch, and in a current less condition it moves away from the clutch. The piston e.g., comprises an anchor element which, more particularly, consists of a ferro-magnetic material, as well as a sleeve which is fixedly connected to the anchor element and which, more particularly, consists of a para-magnetic material. An electro-magnetic actuator has certain advantages in respect of space requirements. However, it is understood that other types of actuator such as an electro-motoric, hydraulic or pneumatic actuator can also be used.

According to a further embodiment, the output part can form part of the transmission unit which is arranged in the rotatingly drivable housing. The transmission unit can be provided in the form of a differential drive, with the output part in this case being provided in the form of a carrier element of the differential drive. By actuating the clutch, transmission of torque from the rotatingly drivable housing to the differential drive can selectively be effected or interrupted. By means of the drive assembly in form of a differential assembly it is possible to achieve the above-mentioned advantages of a simple mounting procedure, a secure connection of the target element and accurate and reliable determination of the position of the first clutch part. This, in turn, permits the driving source to be controlled accurately and rapidly and thus a reliable and rapid control of the driving moment to the associated driving axle of the motor vehicle.

Further, the drive assembly can be provided in the form of an electric drive for driving a vehicle axle. For this purpose, the transmission unit is drivingly connected to an electric motor which serves as the driving source. Such an electric drive can be provided in the form of a primary drive for the motor vehicle or as a secondary drive, with the vehicle, in this case, comprising an internal combustion engine as the primary drive (hybrid drive). The electric drive can be used for driving the front axle or the rear axle. The electric drive can comprise a reduction gear which is arranged in the power path between the electric motor and the differential drive. The power path refers to the mechanical path along which torque is transmitted. Thus, it can also be referred to as transmission path or torque flow.

Furthermore, a method of mounting a drive assembly configured at least according to one of the above-mentioned embodiments comprises inserting the second clutch part onto the rotatingly drivable housing; closing the housing; and positioning the first clutch part on the housing such that the cam elements of the first clutch part extend through apertures of the housing into the inside of the housing. This method greatly simplifies the mounting procedure because the first clutch part can be placed from the outside on to the pre-assembled unit comprising the rotatingly drivable housing. In the mounted condition, the annular portion of the first clutch part is located outside the housing, so that the target element can easily be connected to the annular portion or it can be produced so as to be integral with same.

According to an embodiment, the first clutch part is axially displaceably guided on a sleeve projection of the drivably housing. For this purpose, a sliding disc can be attached to the clutch part, which sliding disc is axially movably guided on a bearing portion of the sleeve projection.

According to a further process step the target element can be slid onto the first clutch part prior to placing the first clutch part on to the housing as a further process step. This is advantageous in that there is no need for any additional fixing elements. The target element can be axially supported towards the actuator against a stop of the first clutch part. In the opposite direction, i.e., towards the second clutch part, the target element can be axially supported against the housing via a spring. In this way, the target element is pre-tensioned against the stop, with the spring, at the same time, acting as a return spring for loading the first clutch part in the opening sense.

SUMMARY OF THE DRAWINGS

Example embodiments will be described below with reference to the figures wherein.

DESCRIPTION OF EXEMPLARY EMBODIMENTS

Figure 1:
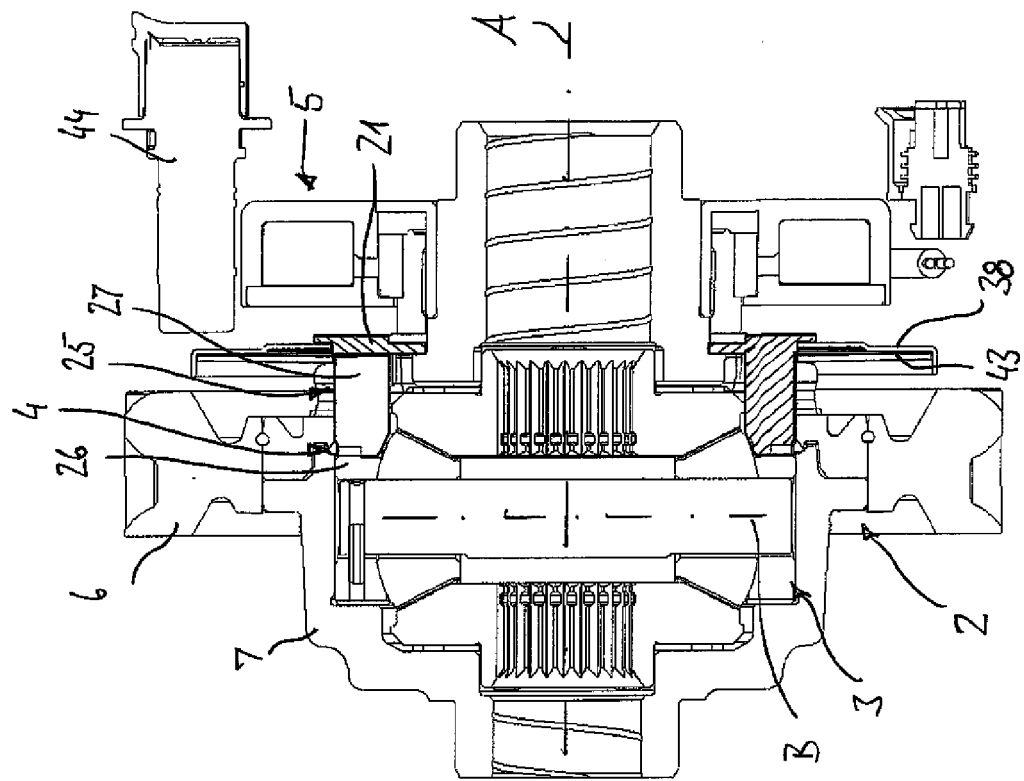
FIG. 1 shows a drive assembly in a first embodiment in a longitudinal section in an open position of the clutch.

FIGS. 1 to 4, which will be described jointly below, show an exemplary drive assembly 2 in a first embodiment. The drive assembly 2 comprises a clutch 4 and a transmission unit 3. The transmission unit 3 is provided in the form of a differential drive, but it is understood that the drive assembly can also comprise units other than a differential drive. The present drive assembly 2 with differential drive can be used in the driveline of a motor vehicle for distributing an introduced torque to the two sideshafts of the motor vehicle, wherein torque transmission between a drive source of the motor vehicle and the sideshafts can selectively be effected or interrupted by means of the clutch.

The clutch 4 is arranged in the power path between a drive part 6 and the output part 13. The drive part is provided in the form of a driving gear 6 and the output part is provided in the form of a carrier element 13 of the transmission unit 3. An actuator 5 is provided for actuating the clutch 4. Torque can be introduced via the driving gear 6 from a drive motor (not illustrated) into the drive assembly 2 for driving the transmission unit 3. The transmission unit is provided in the form of a differential unit, but is not limited thereto. The driving gear 6 is fixedly connected to a housing 7, more particularly by welding, but other types of connections such a bolted connections are also conceivable. The housing 7 comprises a first housing part 8 and a second housing part 9 which, in the region of their aperture-facing ends, each comprise a flange portion 10, 12 by means of which they are connected to the driving gear 6. The transmission unit 3 is received in the housing 7 and is supported so as to be rotatable around an axis of rotation A.

The carrier element 13 of the transmission unit 3 has an annular shape and comprises a substantially cylindrical outer face 14 by which the carrier element 13 is supported relative to a corresponding internally cylindrical surface portion 15 of the housing 7 so as to be rotatable around the axis of rotation A in the housing 7. In the carrier element 13 there are provided two bores 16 into which there is inserted a journal 17 and fixed by a securing pin 18. Two differential gears 19 are supported on the journal 17 so as to be rotatable around a journal axis B. The two differential gears 19 meshingly engage a first and a second sideshaft gear 20, 22 which are arranged coaxially relative to the axis of rotation A. The two sideshaft gears 20, 22 each comprise a longitudinal toothing 23 which can be engaged in a rotationally fixed manner by a corresponding counter toothing of a sideshaft (not illustrated) for transmitting torque. The longitudinal toothing can also be referred to as splines or splined connection. The two sideshaft gears 20, 22 are each axially supported against the housing 7 via friction-reducing discs.

The clutch 4 is provided in the form of a form-locking clutch, e.g., as a dog clutch, but other types of clutches can also be used, such as a friction clutch. The form-locking clutch 4 comprises a first clutch part 25 which is connected to the housing 7 in a rotationally fixed and axially movable way, as well as a second clutch part 26 which is fixedly connected to the carrier element 16. The first clutch part 25 is axially movable relative to the second clutch part 26 and can be made to engage the same for transmitting torque, so that there is produced a form-locking connection between the two clutch parts 25, 26. By disengaging the first clutch part, the transmission of torque is interrupted again.

Figure 3:
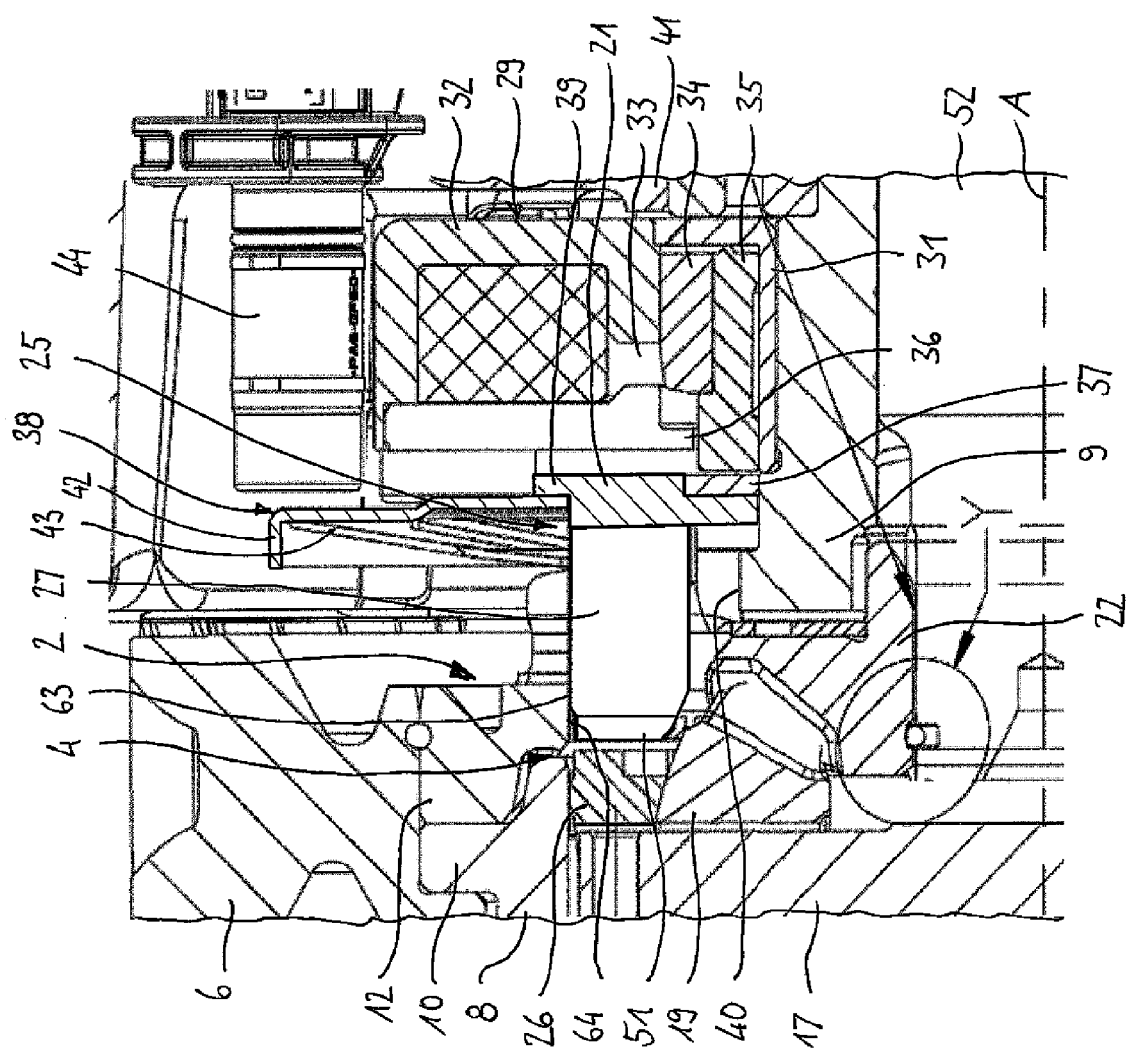
FIG. 3 shows details of the drive assembly according to FIG. 1 in an enlarged view.
Figure 4:
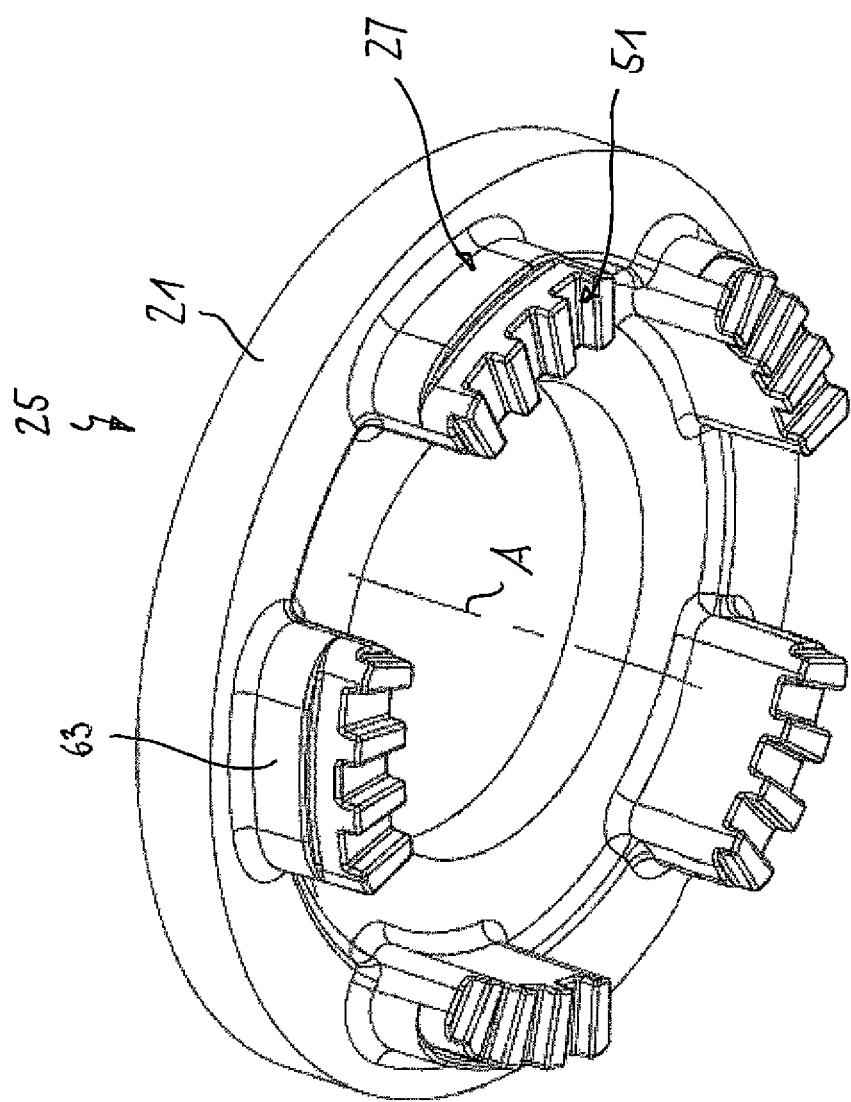
FIG. 4 shows the first clutch part of the drive assembly according to FIG. 1 in the form of a detail in a three-dimensional view at an angle from the front.

The first clutch part 25 which is shown as a detail in FIG. 4, comprises an annular portion 21 which is arranged outside the housing 7, and a plurality of circumferentially distributed cam elements 27 which extend axially from the annular portion 21. The cam elements 27 can also be referred to as axial projections. For transmitting torque from the first clutch part 25 to the housing 7, the cam elements 27 extend through circumferentially distributed apertures 40 of the housing 7, so that the first clutch part 25 rotates jointly with the rotatingly drivable housing 7. It is proposed that the first clutch part 25 is axially guided relative to the housing 7 and coaxially centered relative to the axis of rotation A. The guiding and centering is effected via pairs of surfaces which are formed between outer faces 63 of the cam element 27 and respective inner faces 64 of a housing apertures 40. Highly accurate clearance fits can be provided between the outer faces 63 of the cam elements 27 and the inner faces 64 of the apertures 40 in order to ensure axial moveability of the first clutch part relative to the differential housing while at the same time ensuring good centring accuracy. The longitudinal sections of the illustrations have been selected in such a way that the sectional plane shown the upper half of FIGS. 1 and 2 (in accordance with the sectional plane shown in FIG. 3) extends in the circumferential direction in the region between a housing aperture 40 and a cam element 27, whereas the sectional plane shown in the lower halves of FIGS. 1 and 2 extends through a cam element 27.

The cam elements 27 each comprise form-locking mechanisms at an end facing the transmission, which mechanisms can be a toothed ring segment 51. The toothed ring segments 51 of the first clutch part 25 can be made to engage a toothed ring of the second clutch part 26 for selectively transmitting torque. The toothed ring of the second coupling part 26 is integrally formed at the end face of the carrier element 13 and comprises a toothing which correspond to the toothed ring segments 51 so as to form-fittingly engage the same. By controlling the actuator 5, the first clutch part 25 can be axially moved relative to the second clutch part 26, torque being transmitted from the driving gear 6 to the differential drive 3 in the engaged condition, whereas in the disengaged condition, transmission of torque is interrupted.

It can be seen in FIG. 4 that, according to the present embodiment, the first clutch part 25 comprises five cam elements 27, each comprising a toothed ring segment 51 at its end face. It is understood that it is also possible to use a different number of cam elements 27, and thus a different number of apertures 40, for example, two, three, four, or even more than five. Instead of the face toothing provided at the end faces between the first and the second clutch part 25, 26, it is also possible to use other form-locking mechanisms which can be made to selectively engage each other in a form-locking way for transmitting torque, for instance a Hirth toothing or crown toothing. The first clutch part is coaxially centred and axially guided relative to the housing 7 by the sum of all outer faces 63 of the circumferentially distributed cam elements 27.

The actuator 5 comprises an electro-magnet 29 as well as a piston 30. The actuator 5 is configured such that the piston—when the electro-magnet 29 is electrified—is loaded towards the clutch 4. For this purpose, the electro-magnet 29 comprises an annular housing 32, which comprises an annular gap 33 in a radially inner portion of the housing at an end facing the clutch 4. The piston 30 is axially movably arranged inside said portion of the housing. The housing 32 is arranged on a sleeve projection of the second housing part 9 by means of a carrier element 31. The piston 30 comprises an anchor element 34 consisting of a ferromagnetic material, for example an iron material, as well as a sleeve 35 produced from a para-magnetic material such as high-grade steel, copper or aluminium. The anchor element 34 is sleeve-shaped and pressed on to the sleeve 35. Because the anchor element 34 consists of a ferro-magnetic material it is moved towards the clutch 4 when the electro-magnet 29 is actuated, with the annular gap 33 being bridged. In its end position, the anchor element 34 is made to contact a shoulder 36 of the magnet housing 32, thus generating a friction contact. The sleeve 36 is paramagnetic in order to prevent an undesirable magnet flow leakage on to other components.

The sleeve 35 is axially longer than the anchor element 34 and comprises an end face which is in contact with a sliding disc 37. The sliding disc 37 is axially supported by the first clutch part 25 and, more particularly, is located in an annular recess in an end face of the annular portion 21. The sliding disc 37 is produced from a friction-reducing material, more particularly bronze, to reduce the wear caused by the relative rotational movement between the anchor element 34 and the sliding disc 37.

The target element 38 is fixed on a radially outer end of the annular portion 21 in such a way that, when the clutch 4 is actuated, the target element 38 and the first clutch part 25 move jointly. For this purpose, the annular portion 21 comprises an annular flange 39 which serves as the axial stop for the target element 38. The target element 38 is provided in the form of an annular disc which, on its radial inside, is axially supported against the flange 39 by means of an annular portion. At its radially outer end, the annular disc comprises a cylindrical portion 42. A returning spring 43 is positioned with pre-tension between the housing 7 and the target element 38 and loads the target element 38 against the flange 39. To that extent, the spring 43 has two functions, i.e., a returning function for opening the clutch 4 when the actuator 5 is not actuated and a function of axially fixing the target element 38 on the first clutch part 25. In the present embodiment, the returning spring is provided in the form of a plate spring, and it is to be understood that that other types of spring such as a helical spring or conical spring can be used.

Furthermore, a sensor 44 is provided which is axially arranged in the region of the actuator 5 and which cooperates with the target element 38. In the present embodiment the sensor is provided in the form of a Hall sensor which is able to determine the distance from the target element 38 in a contact-free way. It is also possible to use another contact-free sensors, for instance an induction sensor. The sensor 44 is received in a fixed housing 41 (shown only partially).

Figure 2:
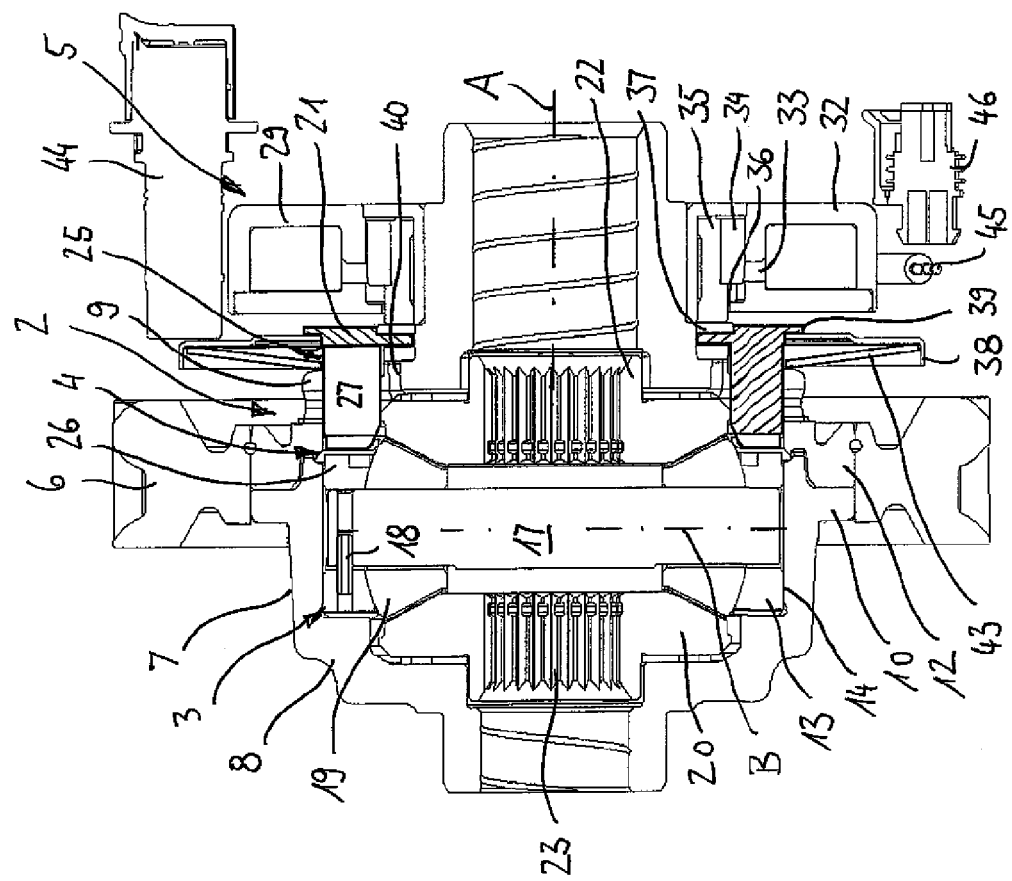
FIG. 2 shows the drive assembly according to FIG. 1 in a closed position of the clutch.

In the open position of the clutch 4, i.e., in the position in which the target element 38 axially approaches the sensor 44, there is provided a small gap between the target element 38 and the sensor 44. Said position in which the clutch 4 is open, is shown in FIG. 1. FIG. 2, on the other hand, shows a condition in which the clutch 4 is in an engaged condition for transmitting torque from the driving gear 6 to the carrier element 13. It can be seen that the target element 38 together with the first clutch part 25, has been moved relative to the sensor 44 towards the second clutch part 26 and, respectively, towards the transmission unit 3. Furthermore, FIGS. 1 and 2 show connecting cables 45 as well as a cable passage 45 for guiding the cable 45 through a fixed housing 41.

The distance between the target element 38 and the sensor 44 is determined in an electronic control unit (ECU, not illustrated.) Input values for the ECU are at least the sensor signal of the sensor 44 as well as an amperage signal of the electro-magnet 29. From said values, the distance between the sensor 44 and the target element can be calculated, with the calculated data allowing conclusions regarding the depth of engagement of the first clutch part 25 in the second clutch part 26.

FIG. 3 shows the drive assembly 2 according to FIG. 1 in the form of an enlarged detail in a slightly modified embodiment. The spring 43 is shown in the form of a conical spring instead of a plate spring.

FIG. 4 shows the first clutch part 25 of FIGS. 1 to 3 in the form of a detail in a three-dimensional illustration at an angle from the front towards the side of the annular portion 21 which comprises the cam elements 27 with the form engaging means 51. The first clutch part 25 is produced in one piece and, more particularly, can produced as a forging or sintered part respectively. The second clutch part 26 comprises an annular portion with second form engaging mechanisms which are produced so as to correspond to the first form engaging means 51, so that the two engaging mechanisms are able to engage one another in a form-locking way for transmitting torque. The second form-engaging mechanisms of the second clutch part 26 are distributed around the entire circumference, so that the two clutch parts 25, 26 can be made to engage one another in any angular, respectively rotary position of the first clutch part 25.

Figure 5:
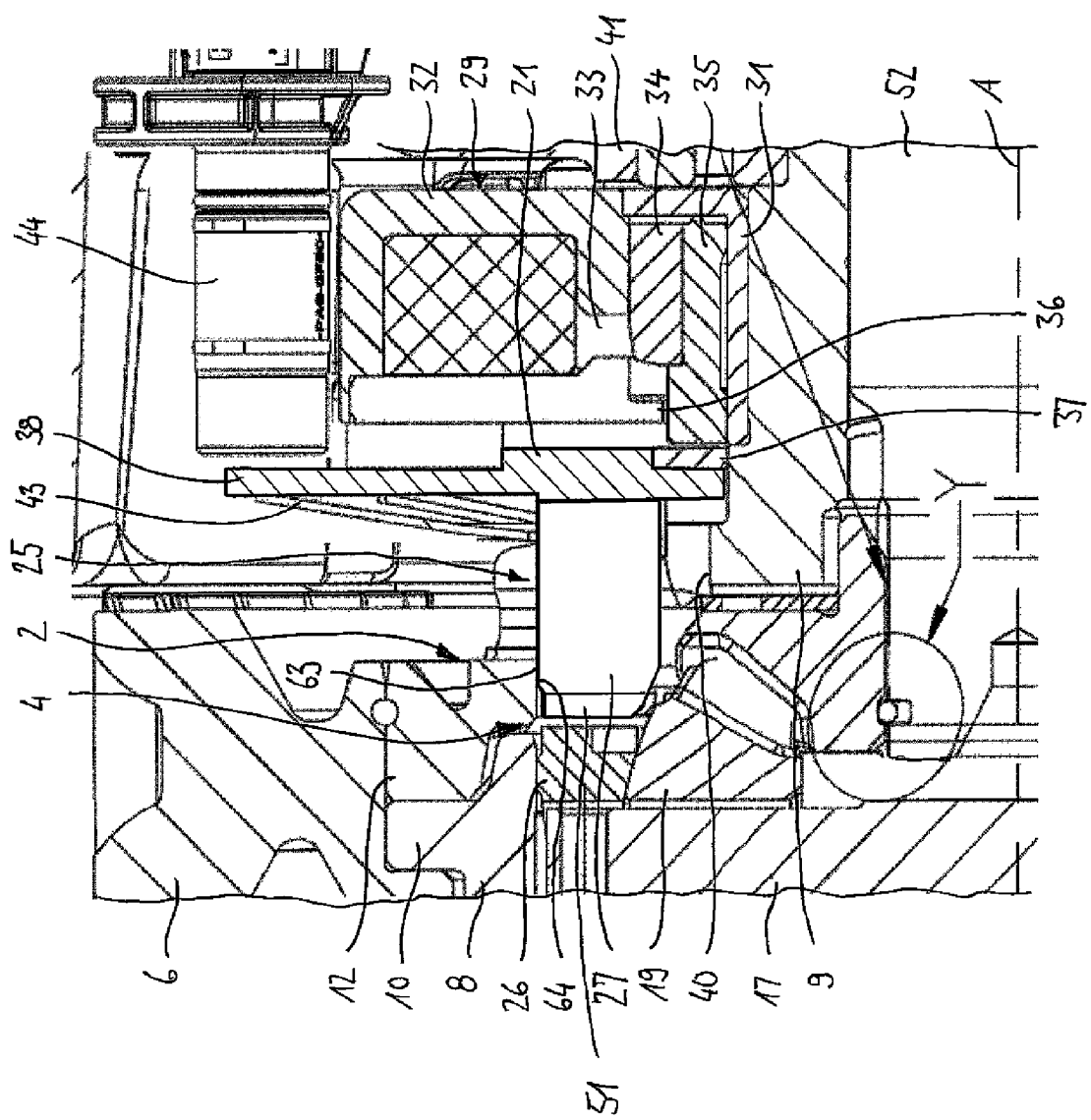
FIG. 5 shows a drive assembly in a second embodiment in a longitudinal section in an open position of the clutch.

FIG. 5 shows a drive assembly in a further embodiment which largely corresponds to the embodiments according to FIGS. 1 to 4, so that, as far as common details are concerned, reference is made to the above description, so that as far as identical and modified components are concerned, the same reference numbers are used in FIGS. 1 to 4. The longitudinal section as shown in FIG. 5 extends in the circumferential region between a housing aperture 40 and a cam element 27, which is the reason why the annular portion 21 of the first clutch part is hatched and the cam element 27 is not hatched. Below, reference is made more particularly to the special features of the present embodiment.

A feature of the embodiment according to FIG. 5 is that the target element 38 is produced so as to be integral with the first clutch part 25. This is advantageous in that the number of parts is small. The annular portion 21, in turn, can be produced so as to be integral with the cam elements 27 or so as to be connected to same, which cam elements 27 project axially from said annular portion 21. It can be seen that the target element 38 is provided in the form of an annular disc which extends radially outwardly from the annular portion 21 of the first clutch part 25 as far as the sensing region of the sensor 44. The thickness of the annular disc 38 is greater than in the embodiment according to FIGS. 1 to 4. This results in a greater stiffness of the annual disc 38, which, in turn, leads to a greater dimensional stability and more accurate sensing. The unit consisting of the annular-disc-shaped target element 38 and a first annular portion 21 and a first clutch part 25 respectively is e.g., produced from a ferro-magnetic material.

Figure 6:
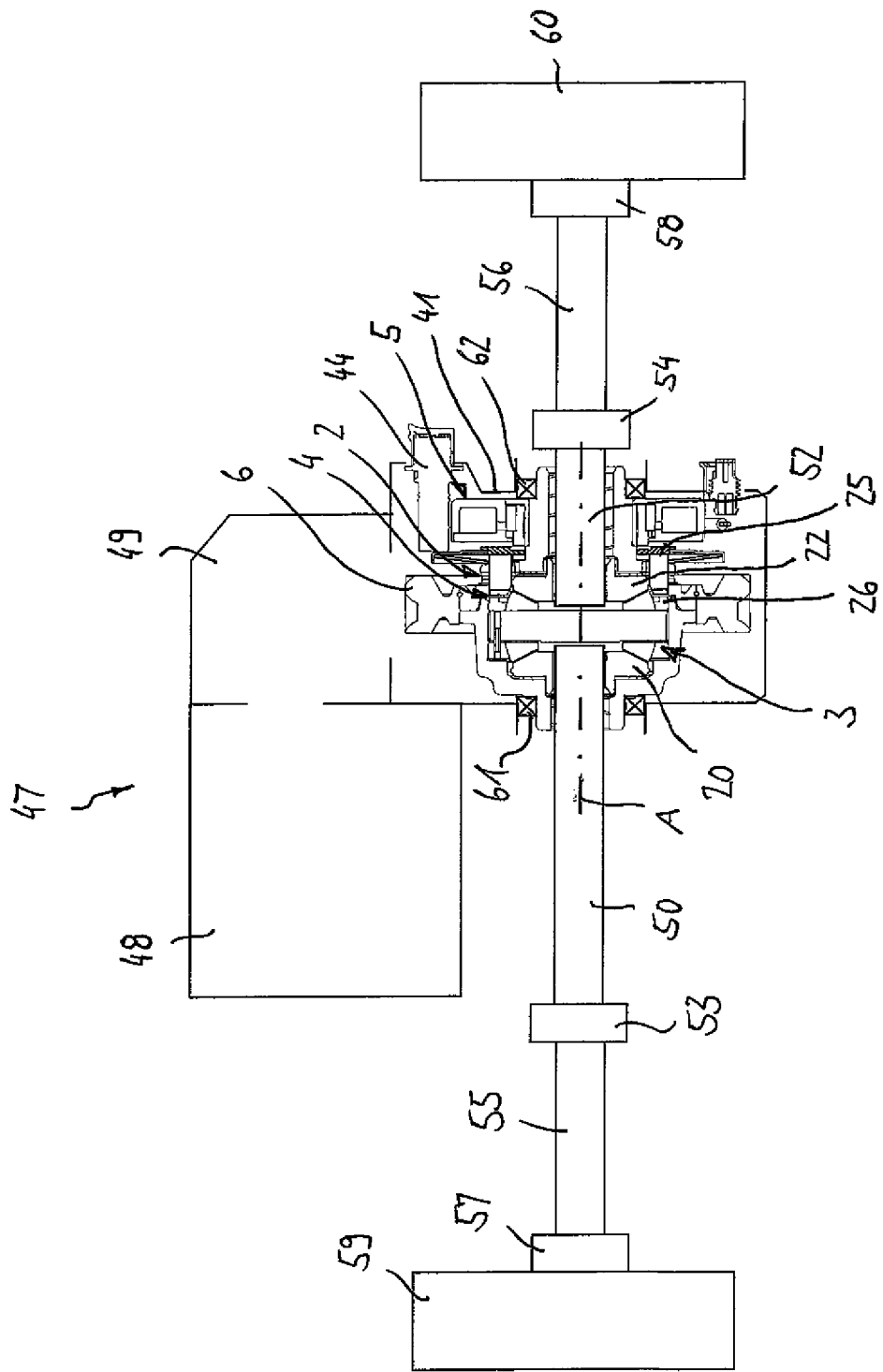
FIG. 6 shows a drive assembly as part of an electric drive according to FIG. 1 in a diagrammatic view.

FIG. 6 shows the drive assembly 2 according to FIGS. 1 to 4 as part of an electric drive 47 in a diagrammatic illustration. The electric drive 47 comprises an electric motor 48 which, via a transmission 49, drives the drive assembly 2 and, respectively, the driving gear 6 of the drive assembly 2. The torque introduced when the clutch 4 is closed is transmitted by the differential drive 3 to the two sideshaft gears 20, 22. For torque transmitting purposes, the sideshafts 50, 52 are inserted in a rotationally fixed way into the longitudinal toothing 23 (splines) of the sideshaft gears 20, 23. At the ends of the sideshafts 50, 52 there are arranged constant velocity joints which, in turn, are drivingly connected to wheels 59, 60 of the motor vehicle via drive shafts 55, 56 and joints 57, 58. It can be seen that the drive assembly 2 is supported by bearings 61, 62 relative to the stationary housing 41 so as to be rotatable relative to the axis of rotation A.

Electric drives 47 comprise a limited speed range and are usually used as auxiliary drives in a motor vehicle which comprises an internal combustion as the main drive. The electric drive 48 is used above all for low vehicle speeds for driving the vehicle, for example in urban traffic where frequent starting and braking occurs. Because of the relatively high available torque of the electric motor, good traction and good starting behaviour are ensured. In the case of higher vehicle speeds, for example, during long-distance driving, the electric motor can be switched off to prevent the drag moment of the electric motor from having an adverse effect on the efficiency of the motor vehicle and fuel consumption. For disconnecting the electric motor 48, there is used the controllable clutch 4 which is arranged in the power path between the electric motor and the differential drive 3. When the clutch 4 is open, all the components arranged in the power path of the clutch 4 are stationary, which has an advantageous effect on friction losses and thus on fuel consumption.

Overall, the drive assembly 2 according to the above-described embodiment has the advantage in that it comprises a secure and dimensionally stable connection between the target element 38 and the first clutch part 25. Undesirable deformation of the target element can thus be avoided or at least reduced, which advantageously effects the sensing accuracy with reference to the sensor. A further advantage of the annular portion 21 of the first clutch part 25 arranged outside the housing 7 consists in that the first clutch part 25 with the target element 38 can be mounted easily and cost-effectively. Furthermore, the sliding disc 37 which is connected to the first clutch part and which cooperates with the actuator 5 is advantageously supported around the entire circumference.

The invention claimed is:

1. A drive assembly, comprising:
a rotatably drivable housing, an output part, and a clutch that is arranged in a power path between the rotatably drivable housing and the output part, wherein the clutch comprises a first clutch part held so as to be rotationally fixed and axially movable relative to the housing, and a second clutch part that is fixedly connected to the output part and that is arranged in the rotatably drivable housing;
a controllable actuator for actuating the clutch such that the first clutch part and the second clutch part are selectively connectable to one another for transmitting torque;
a target element that is configured to be axially movable upon actuation of the clutch; and
a sensor that is configured to cooperate with the target element to determine a clutch position of the clutch;
wherein the first clutch part comprises an annular portion that is arranged outside the housing, and a plurality of cam elements that extend axially from the annular portion through apertures in the housing into the interior of the housing.

2. The drive assembly of claim 1, wherein the target element is axially fixed to the first clutch part whereby the target element moves jointly with the first clutch part upon actuation of the clutch.

3. The drive assembly of claim 1, wherein the cam elements each comprise a first toothing at an end facing the second clutch part, which first toothing is selectively engageable with a second toothing of the second clutch part for transmitting torque.

4. The drive assembly of claim 1, wherein the first clutch part comprises at least three cam elements uniformly distributed around the circumference.

5. The drive assembly of claim 1, wherein the annular portion comprises a sliding disc at an end face facing the actuator.

6. The drive assembly of claim 1, wherein the annular portion and the cam elements are integrally formed.

7. The drive assembly of claim 1, wherein the target element comprises an annular disc.

8. The drive assembly of claim 1, wherein the target element comprises an annular supporting portion that is axially supported against a flange portion of the first clutch part.

9. The drive assembly of claim 1, wherein the target element and the annular portion of the first clutch part are integrally formed.

10. The drive assembly of claim 1, wherein the target element is axially supported against the rotatably drivably housing by a pretensioned spring.

11. The drive assembly of claim 1, wherein the output part is provided in the form of a carrier element of a transmission unit and is rotatably supported in the housing, wherein a torque transmission from the rotatably drivable housing to the transmission unit is selectable by actuating the clutch.

12. The drive assembly of claim 1, wherein the second clutch part and the output part are integrally formed.

13. The drive assembly of claim 1, wherein the rotatably drivable housing is configured to be driven by an electric motor.

14. A method of mounting a drive assembly, the drive assembly comprising a rotatably drivable housing, an output part, and a clutch that is arranged in a power path between the rotatably drivable housing and the output part, wherein the clutch comprises a first clutch part held so as to be rotationally fixed and axially movable relative to the housing, and a second clutch part that is fixedly connected to the output part and that is arranged in the rotatably drivable housing; a controllable actuator for actuating the clutch such that the first clutch part and the second clutch part are selectively connectable to one another for transmitting torque; a target element that is configured to be axially movable upon actuation of the clutch; and a sensor that is configured to cooperate with the target element to determine a clutch position of the clutch; wherein the first clutch part comprises an annular portion that is arranged outside the housing, and a plurality of cam elements that extend axially from the annular portion through apertures in the housing into the interior of the housing, the method comprising:
    inserting the second clutch part into the rotatably drivable housing;
    closing the rotatably drivable housing; and
    positioning the first clutch part on the housing such that the cam elements of the first clutch part engage the apertures of the housing in a rotationally fixed way and can be made to selectively engage the second clutch part for transmitting torque.

15. The method of claim 14, wherein the step of positioning the first clutch part on the housing is preceded by a step of positioning the target element on to the first clutch part.

16. The method of claim 14,
    wherein the first clutch part with the annular portion is axially slid onto a sleeve projection of the housing, wherein the cam elements engage the apertures of the housing; and
    wherein the first clutch part is centered with respect to the housing via one of the cam elements and the annular portion.

* * * * *